United States Patent
Ohashi

(10) Patent No.: US 10,845,572 B2
(45) Date of Patent: Nov. 24, 2020

(54) IMAGING OPTICAL SYSTEM, IMAGING DEVICE, AND PORTABLE INFORMATION TERMINAL DEVICE

(71) Applicant: Kazuyasu Ohashi, Chiba (JP)

(72) Inventor: Kazuyasu Ohashi, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 118 days.

(21) Appl. No.: 16/139,303

(22) Filed: Sep. 24, 2018

(65) Prior Publication Data

US 2019/0121062 A1 Apr. 25, 2019

(30) Foreign Application Priority Data

Oct. 19, 2017 (JP) .................. 2017-202635

(51) Int. Cl.
| | |
|---|---|
| *G02B 9/62* | (2006.01) |
| *G02B 9/58* | (2006.01) |
| *G02B 27/00* | (2006.01) |
| *G02B 13/04* | (2006.01) |
| *G02B 13/00* | (2006.01) |

(52) U.S. Cl.
CPC ............... *G02B 9/62* (2013.01); *G02B 9/58* (2013.01); *G02B 13/0045* (2013.01); *G02B 13/04* (2013.01); *G02B 27/0037* (2013.01)

(58) Field of Classification Search
None
See application file for complete search history.

(56) References Cited

U.S. PATENT DOCUMENTS

| | | | | |
|---|---|---|---|---|
| 5,589,988 | A * | 12/1996 | Suenaga | G02B 15/177 |
| | | | | 359/749 |
| 8,780,454 | B2 * | 7/2014 | Lee | G02B 13/04 |
| | | | | 359/691 |
| 2013/0321936 | A1 | 12/2013 | Ohashi | |
| 2014/0340768 | A1 | 11/2014 | Kubota et al. | |
| 2015/0062718 | A1 | 3/2015 | Ohashi | |
| 2015/0116829 | A1 | 4/2015 | Ohashi | |
| 2015/0212303 | A1 | 7/2015 | Ohashi | |
| 2015/0260968 | A1 | 9/2015 | Ohashi | |
| 2016/0054544 | A1 | 2/2016 | Ohashi et al. | |
| 2016/0077309 | A1 | 3/2016 | Ohashi et al. | |
| 2016/0334609 | A1 * | 11/2016 | Lee | G02B 15/177 |
| 2017/0184815 | A1 * | 6/2017 | Wang | G02B 5/005 |

(Continued)

FOREIGN PATENT DOCUMENTS

| | | |
|---|---|---|
| JP | 5-157965 | 6/1993 |
| JP | 8-313802 | 11/1996 |

(Continued)

*Primary Examiner* — Darryl J Collins
(74) *Attorney, Agent, or Firm* — Oblon, McClelland, Maier & Neustadt, L.L.P.

(57) ABSTRACT

An imaging optical system including a first lens having negative refractive power; a second lens having negative refractive power; a third lens having positive refractive power; an aperture stop; a fourth lens having positive refractive power; a fifth lens having negative refractive power; and a six lens arranged in that order from an object side. The first lens is a negative lens with a concave surface facing the image side. The second lens is a negative lens with a concave surface facing the object side. The second lens and the third lens are joined together to form a cemented lens have positive refractive power.

14 Claims, 11 Drawing Sheets

(56) References Cited

U.S. PATENT DOCUMENTS

2017/0235112 A1    8/2017   Ohashi
2018/0196236 A1    7/2018   Ohashi et al.

FOREIGN PATENT DOCUMENTS

| JP | 11-326756 | 11/1999 |
| JP | 2005-352060 | 12/2005 |
| JP | 2013-250534 | 12/2013 |

* cited by examiner

IMAGING OPTICAL SYSTEM, IMAGING DEVICE, AND PORTABLE INFORMATION TERMINAL DEVICE

CROSS-REFERENCE TO RELATED APPLICATION

This patent application is based on and claims priority pursuant to 35 U.S.C. § 119(a) to Japanese Patent Application No. 2017-202635, filed on Oct. 19, 2017, in the Japan Patent Office, the entire disclosure of which is hereby incorporated by reference herein.

BACKGROUND

Technical Field

Embodiments of the present disclosure relate to an imaging optical system, an imaging device, and a portable information terminal device.

Background Art

In recent years, imaging devices, especially digital cameras, have a very large market, and users' demands for digital cameras are diversified.

Particularly, users are looking forward to high-quality compact cameras mounted with a relatively large image sensor having a diagonal length of approximately 20 millimeters (mm) to 45 mm and high-performance single focus lenses. In addition, there is a great demand for such imaging devices to be portable and compact.

High performance imaging devices are expected to have resolution corresponding to an image sensor of at least 24 million pixels or more, generate few coma flares, have high contrast, and form a point image with less distortion in an area up to the periphery of angle of view in opening an aperture. Further, in such imaging devices, an area where there are few chromatic aberration and a great difference in luminance is not unnecessarily colored, and a straight line can be drawn as a straight line due to less distortion aberration.

In order to increase the diameters of lenses, the high performance imaging devices need to have an F number of approximately at least 2.8 to 3.3, so as to be distinguished from typical compact cameras mounted with a zoom lens.

The actual focal length becomes longer as the size of the image sensor is relatively large. To reduce the size of an imaging device, the total length of the image-forming lens system is to be significantly reduced when normalized by the focal length or the maximum image height.

Many users desire image-forming optical systems with a wider angle of view to some extent. Accordingly, an image-forming optical system desirably has a half angle of view of 35 degrees or more. In this case, the half angle of view of 35 degrees corresponds to about 31 mm at a focal length of 35 mm silver salt camera.

Among many kinds of image-forming optical systems, a retrofocus image-forming optical system is a representative wide angle prime lens in which a lens group having negative refractive power is disposed on the object side and a lens group having positive refractive power is disposed on the image side.

SUMMARY

In one aspect of this disclosure, there is provided an improved imaging optical system including a first lens having negative refractive power; a second lens having negative refractive power; a third lens having positive refractive power; an aperture stop; a fourth lens having positive refractive power; a fifth lens having negative refractive power; and a sixth lens arranged in that order from an object side. The first lens is a negative lens with a concave surface facing the image side. The second lens is a negative lens with a concave surface facing the object side. The second lens and the third lens are joined together to form a cemented lens have positive refractive power.

In another aspect of this disclosure, there is provided an improved imaging device comprising the imaging optical system to form an image on a given imaging area.

In still another aspect of this disclosure, there is provided an improved portable information terminal device comprising the imaging device.

BRIEF DESCRIPTION OF THE DRAWINGS

The aforementioned and other aspects, features, and advantages of the present disclosure will be better understood by reference to the following detailed description when considered in connection with the accompanying drawings, wherein.

DETAILED DESCRIPTION

Figure 1:
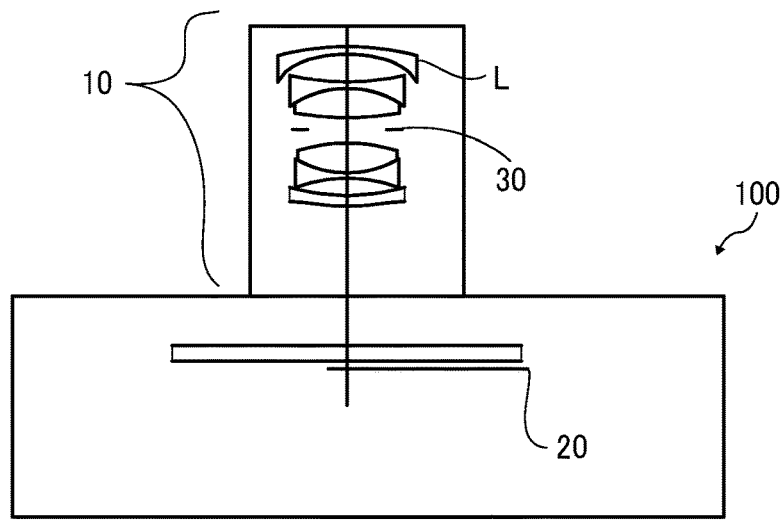
FIG. 1 is an illustration of the overall configuration of an imaging device according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and all of the components or elements described in the embodiments of this disclosure are not necessarily indispensable.

Embodiments of the present disclosure are described in detail with reference to the drawings. Like reference numerals designate identical or corresponding components throughout the several views and a description of same is omitted.

Initially with reference to FIG. 1, an imaging device 100 that includes an imaging optical system (a lens system 10) is described according to an embodiment of the present disclosure.

The imaging device 100 includes an image sensor 20, a stop 30, and a lens system 10 as an imaging optical system. The image sensor 20 is disposed such that a photo-sensing surface coincides with an image plane. The stop 30 is disposed closer to the object than the image sensor 20 does. The lens system 10 includes a plurality of lenses L arranged in a prescribed order.

Figure 2:
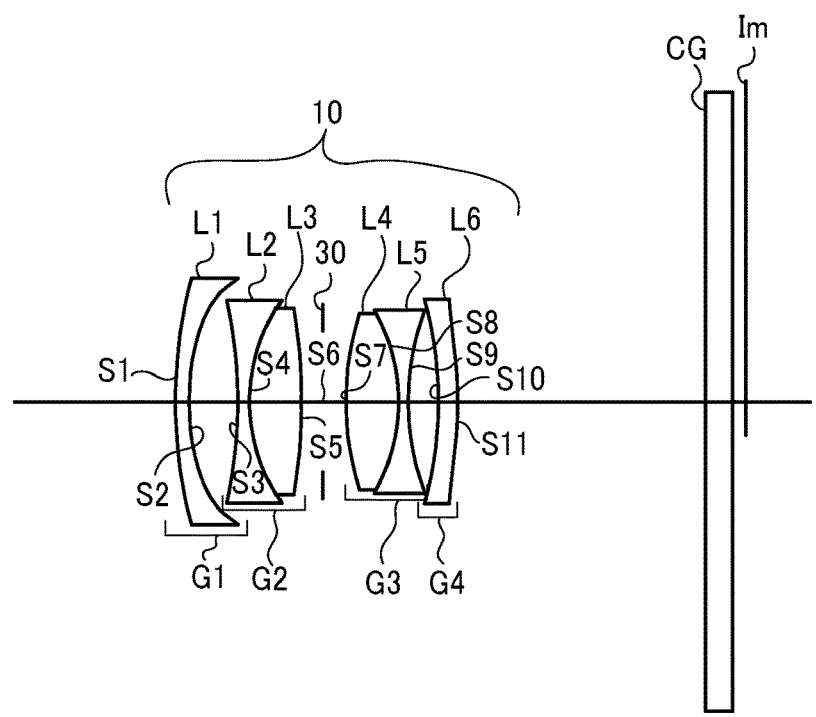
FIG. 2 is an illustration of an imaging optical system of the imaging device in FIG. 1.
Figure 3:
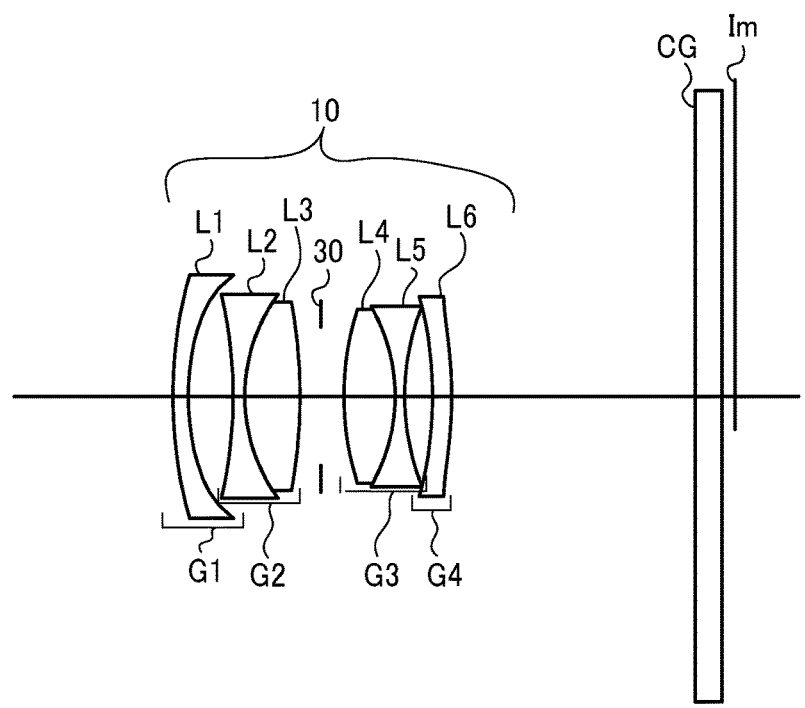
FIG. 3 is an illustration of an imaging optical system according to a second embodiment of the present disclosure.
Figure 4:
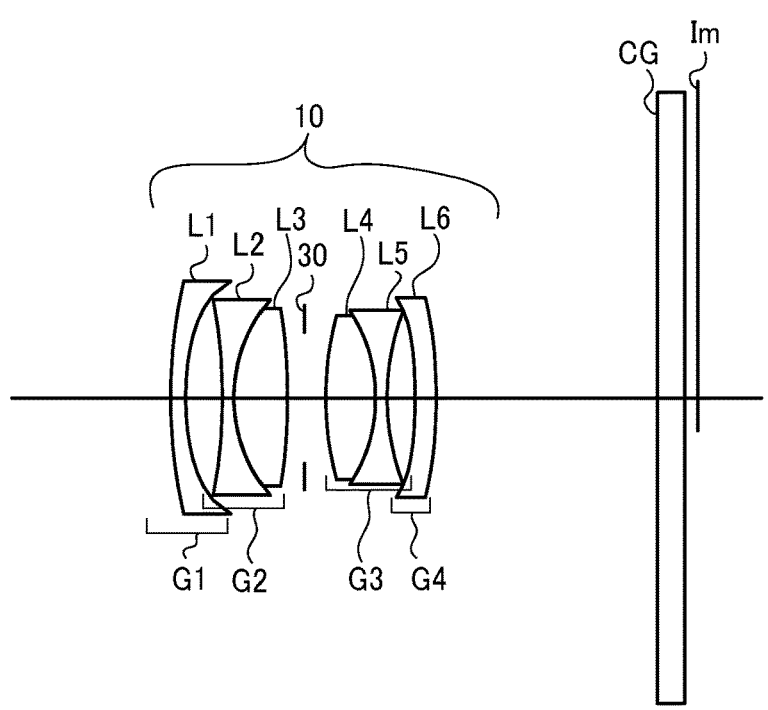
FIG. 4 is an illustration of an imaging optical system according to a third embodiment of the present disclosure.
Figure 5:
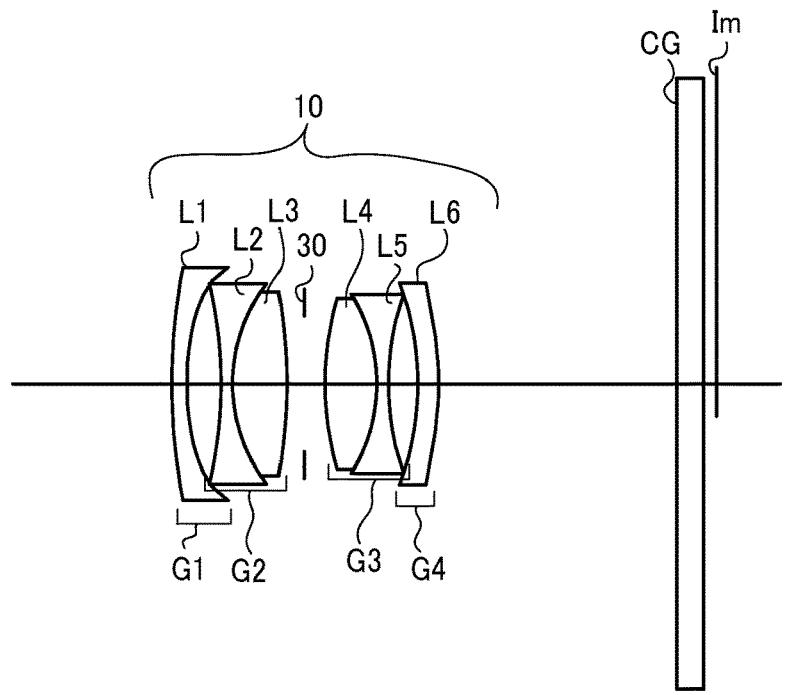
FIG. 5 is an illustration of an imaging optical system according to a fourth embodiment of the present disclosure.
Figure 6:
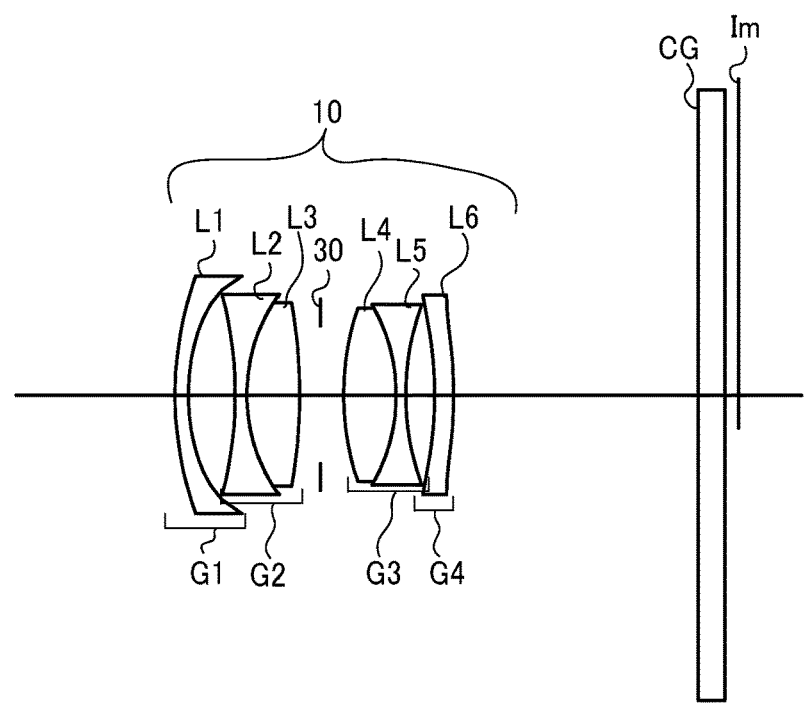
FIG. 6 is an illustration of an imaging optical system according to a fifth embodiment of the present disclosure.
Figure 7:
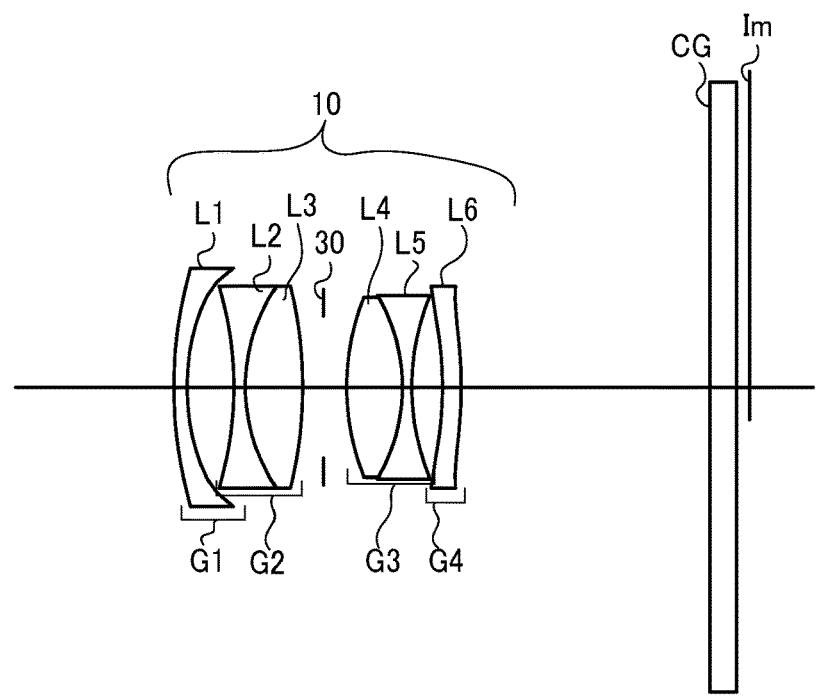
FIG. 7 is an illustration of an imaging optical system according to a sixth embodiment of the present disclosure.
Figure 8:
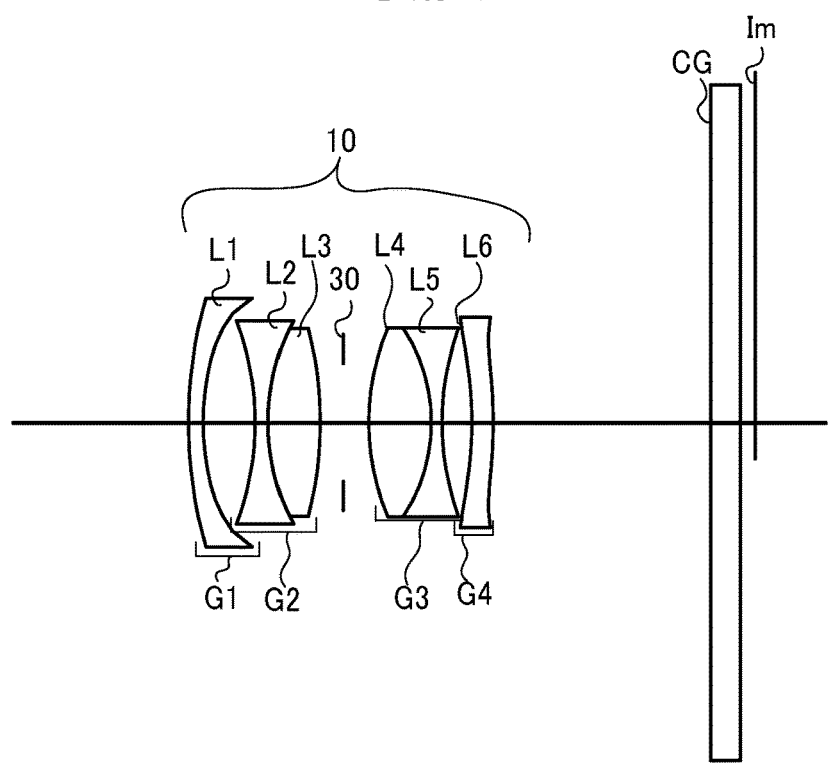
FIG. 8 is an illustration of an imaging optical system according to a seventh embodiment of the present disclosure.
Figure 9:
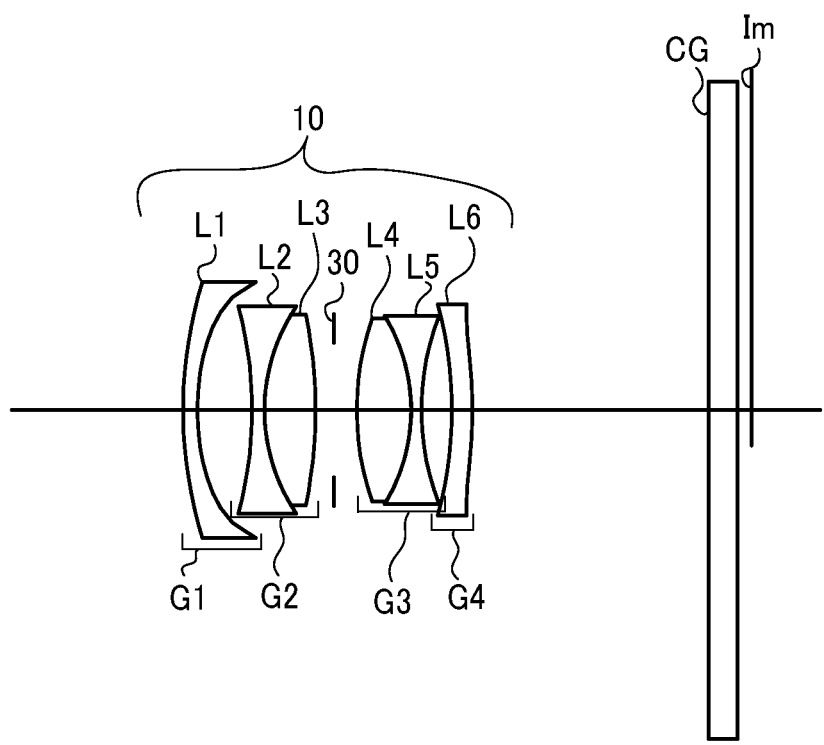
FIG. 9 is an illustration of an imaging optical system according to an eighth embodiment of the present disclosure.
Figure 10:
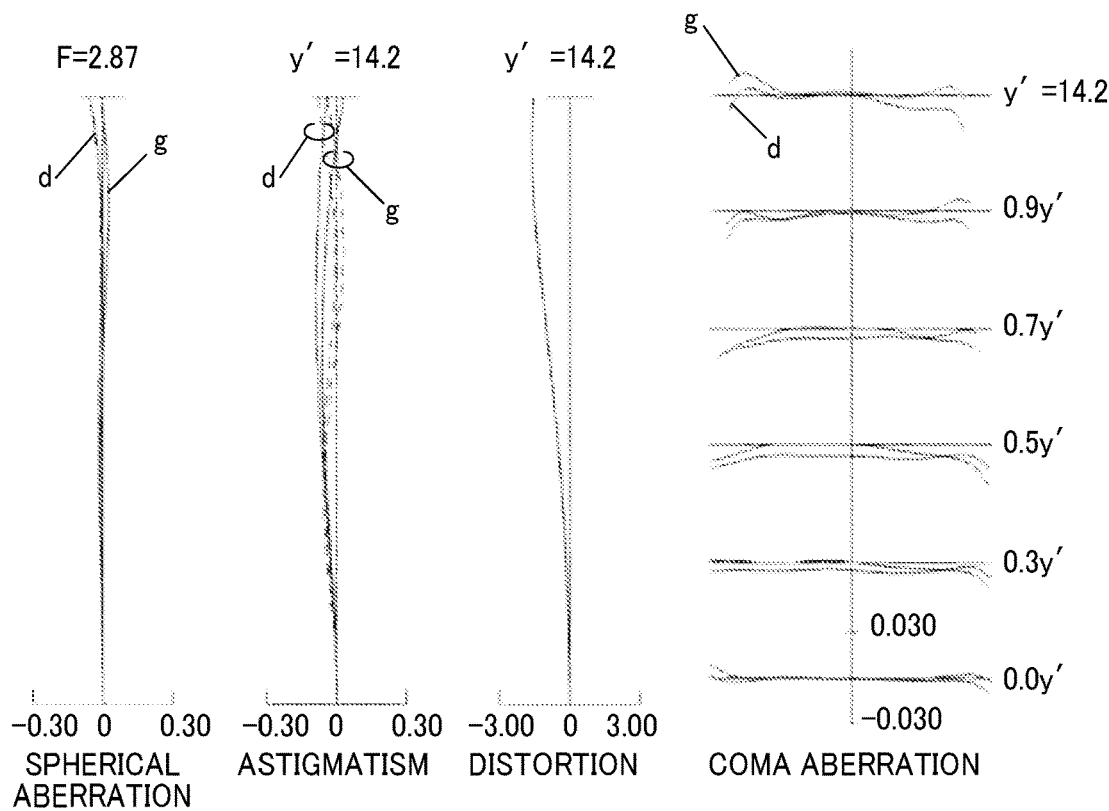
FIG. 10 is an aberration diagram of the imaging optical system in FIG. 2.
Figure 11:
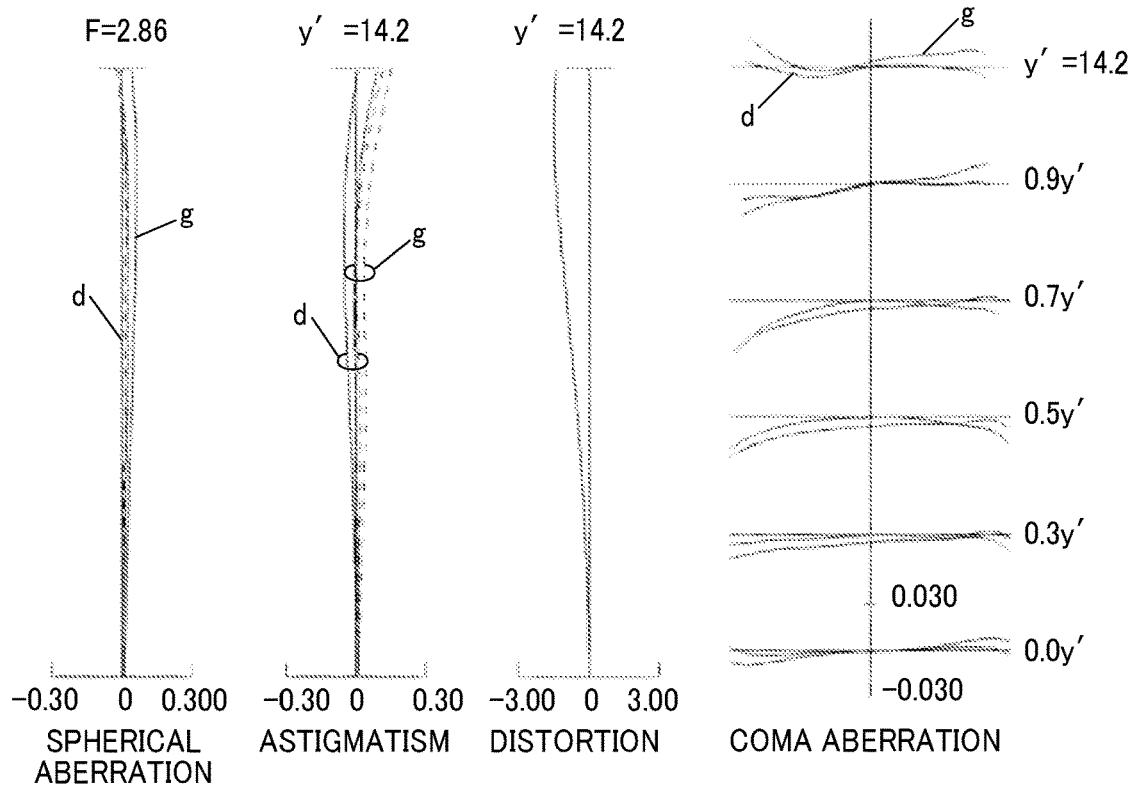
FIG. 11 is an aberration diagram of the imaging optical system in FIG. 3.
Figure 12:
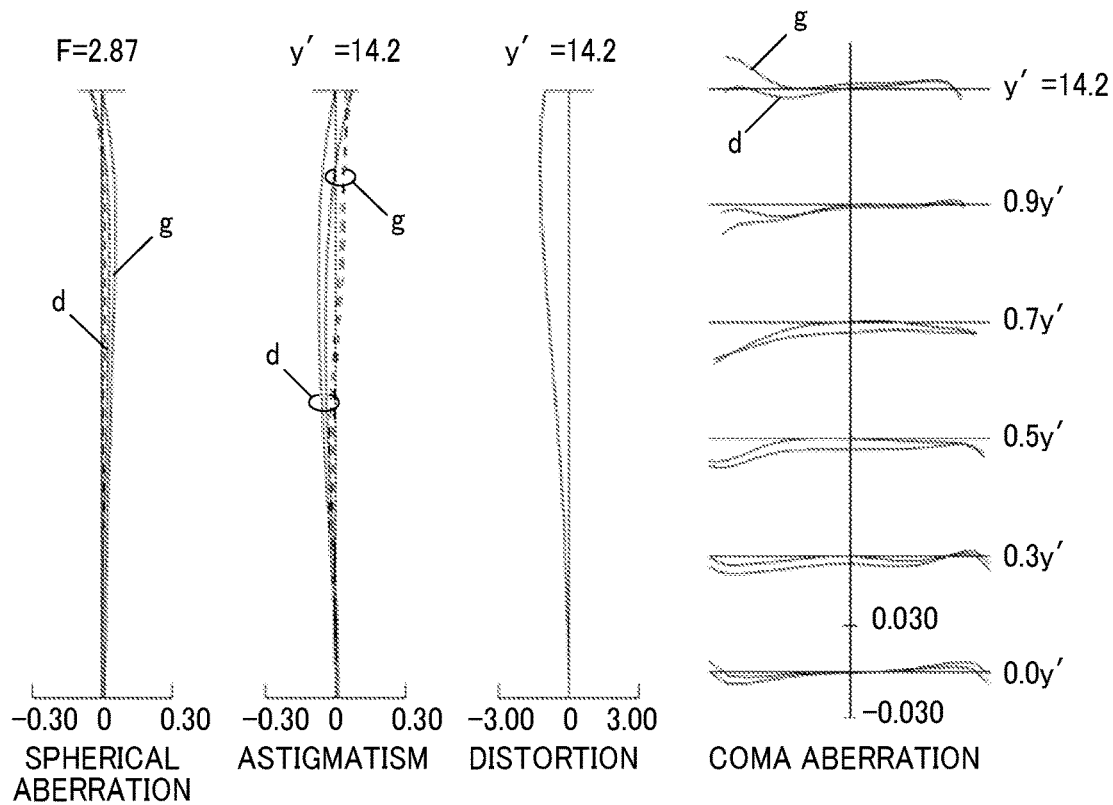
FIG. 12 is an aberration diagram of the imaging optical system in FIG. 4.
Figure 13:
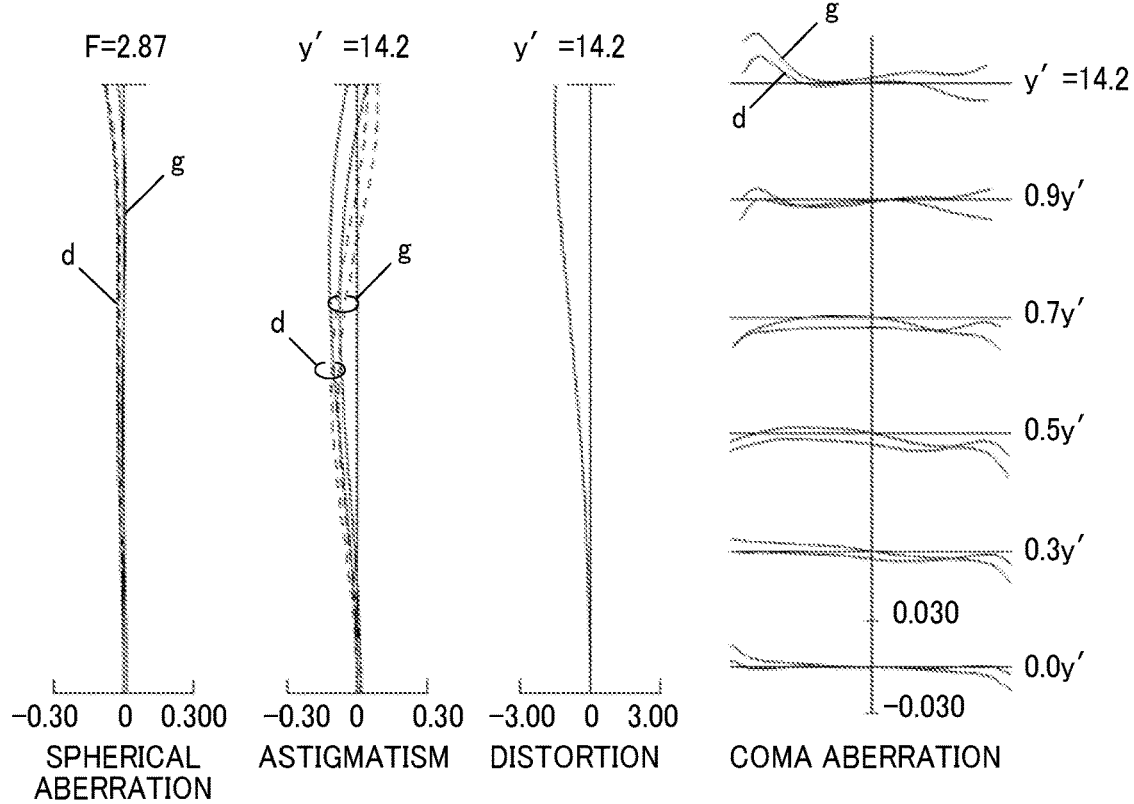
FIG. 13 is an aberration diagram of the imaging optical system in FIG. 5.
Figure 14:
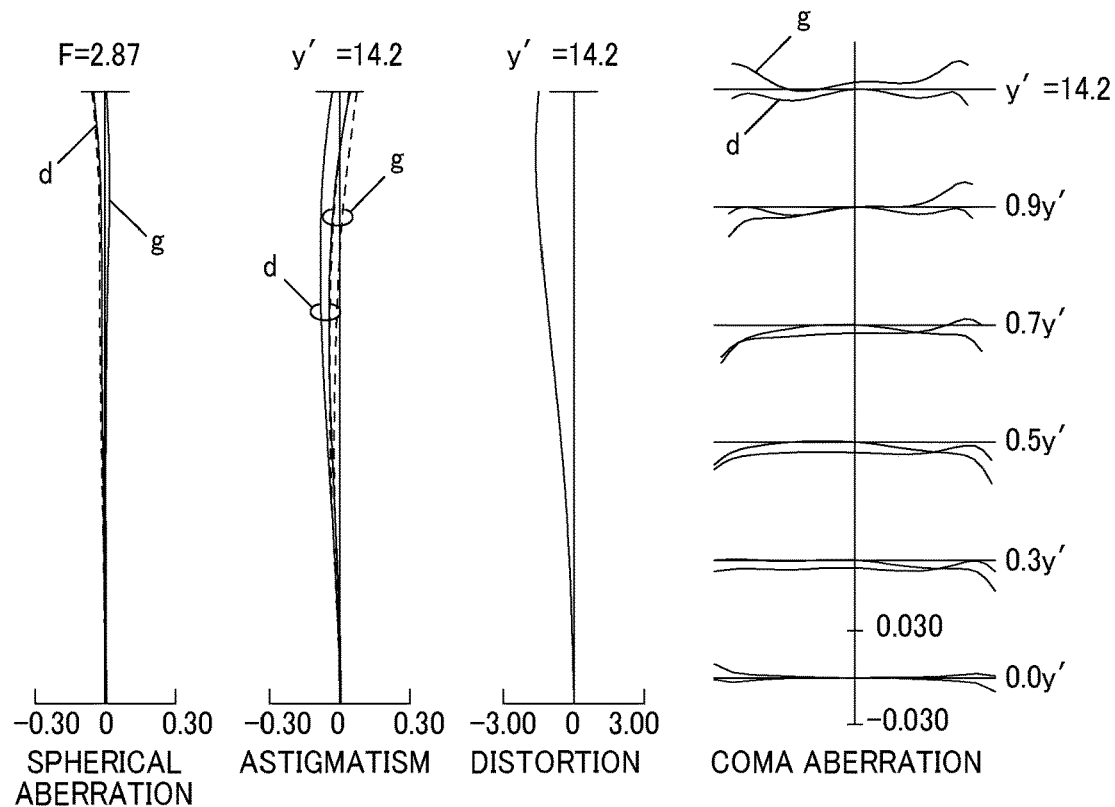
FIG. 14 is an aberration diagram of the imaging optical system in FIG. 6.
Figure 15:
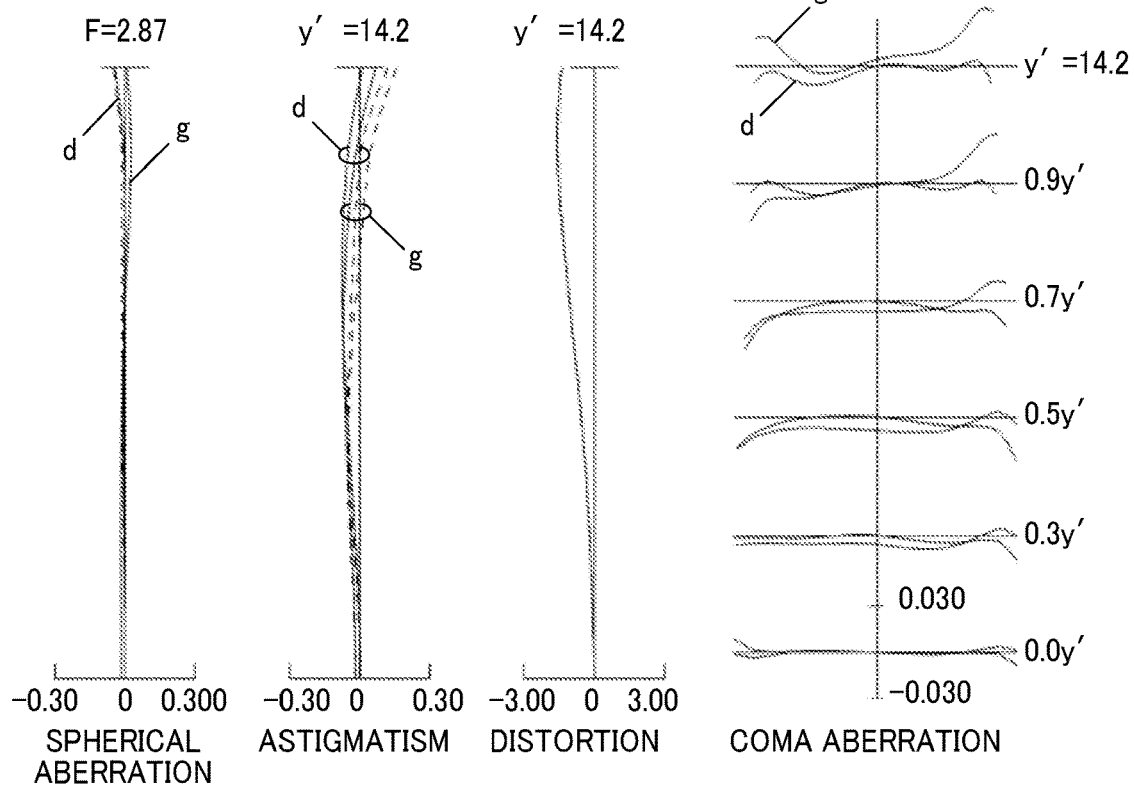
FIG. 15 is an aberration diagram of the imaging optical system in FIG. 7.
Figure 16:
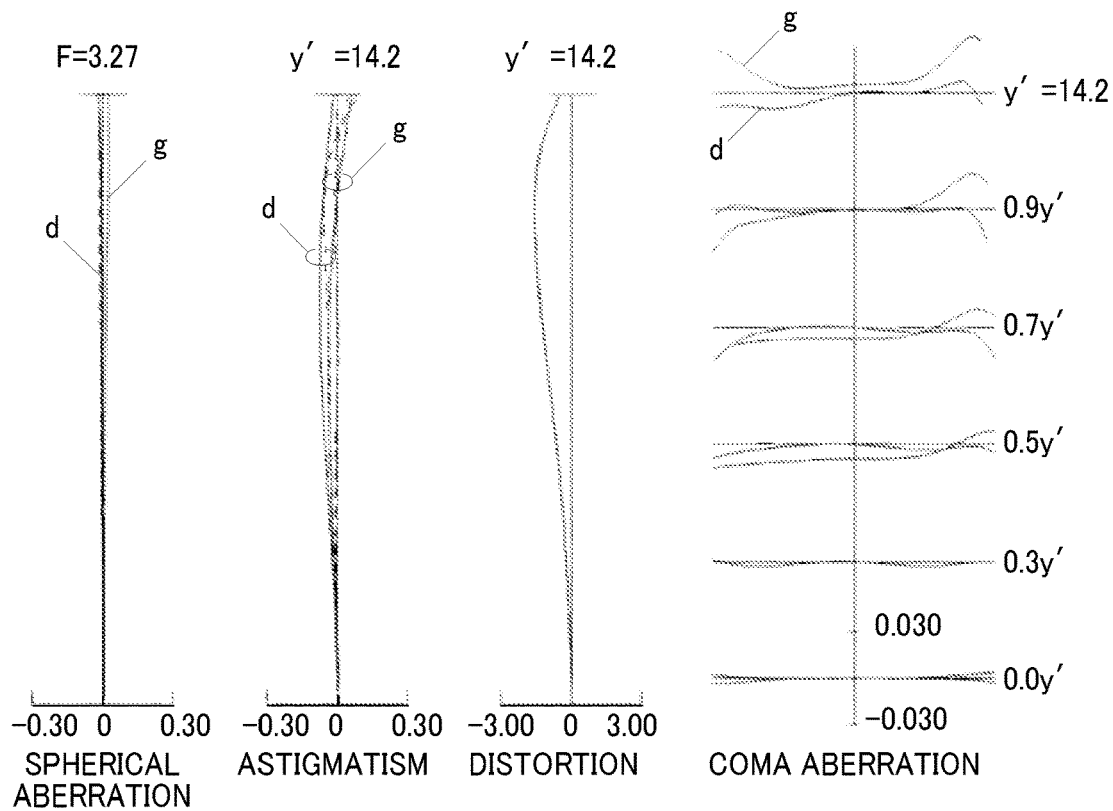
FIG. 16 is an aberration diagram of the imaging optical system in FIG. 8.
Figure 17:
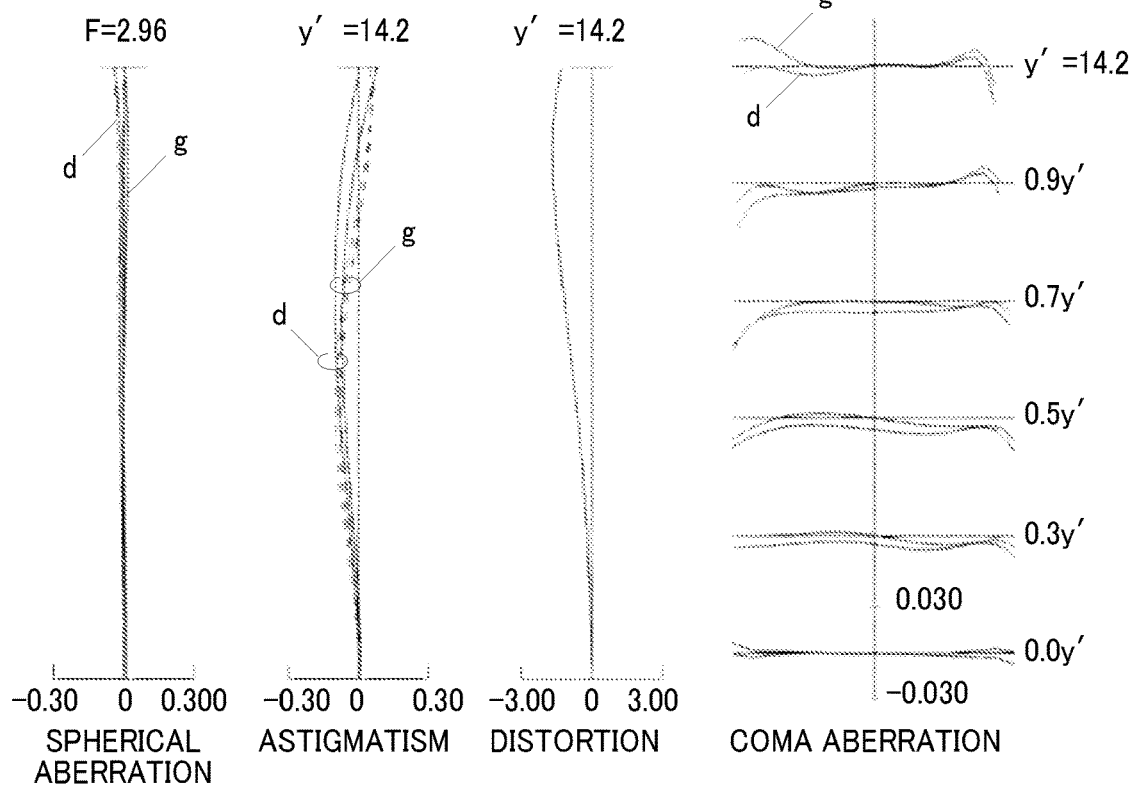
FIG. 17 is an aberration diagram of the imaging optical system in FIG. 9.

As illustrated in FIG. 2, the lens system 10 includes a first lens L1 having negative refractive power, a second lens L2 having negative refractive power, a third lens L3 having positive refractive power, the stop 30, a fourth lens LA having positive refractive power, a fifth lens L5 having negative refractive power, and a sixth lens L6 arranged in that order from the object side.

It is assumed that an image formed by the lens system 10 onto the image plane Im is captured by the image sensor 20. In FIGS. 2 to 8, a cover glass CG of the image sensor 20 is disposed.

The cover glass CG is a parallel plate, and the photo-sensing surface of the image sensor 20 coincides with the image plane Im.

The cover glass CG serves to shield the photo-sensing surface of the image sensor 20. In some embodiments, the cover glass CG serves as a shield as well as, for example, an infrared cut filter.

As described above, the lens system 10 has a substantially symmetrical power arrangement in which positive refractive power and negative refractive power are arranged in this order from the stop 30 in each of a direction to the image and a direction to the object.

That is, the lens system 10 is arranged so that the signs of the powers of the lenses constituting the lens system 10 are symmetric with respect to the stop 30.

Further, as will be described later, the first lens L1 and the second lens L2 are arranged such that the concave surfaces thereof face each other. This arrangement makes it easy to correct coma aberration, distortion aberration, and lateral chromatic aberration.

The first lens L1 is a negative lens having a concave surface facing the image side. In the present embodiment, one lens (the first lens L1) constitutes a first lens group G1.

The second lens L2 is a negative lens having a concave surface facing the object side. That is, the first lens L1 and the second lens L2 are arranged so that the concave surfaces thereof face each other.

The third lens L3 has positive refractive power and is integrated with the second lens L2 to form a cemented lens.

The cemented lens formed by joining the second lens L2 and the third lens L3 together has positive refractive power as a whole and constitutes the second lens group G2.

The stop 30 is an aperture stop disposed closer to the image side than the third lens L3 and closer to the object side than the fourth lens L4.

The fourth lens L4 has positive refractive power.

In the present embodiment, the fifth lens L5 is a negative lens having a concave surface facing the image side.

The fourth lens L4 and the fifth lens L5 are joined together to form a cemented lens having positive refractive power that constitutes the third lens group G3.

In this manner, the third lens group G3 is a cemented lens group having positive refractive power. This configuration advantageously corrects axial chromatic aberration.

The sixth lens L6 is a meniscus lens having a concave surface facing the object side at least in the paraxial region. The refractive power of the sixth lens L6 is set weakest among the lenses L of the lens system 10.

With such a configuration, the negative power of the entire lens system is biased toward the object side with respect to the stop 30. This arrangement can further advantageously correct coma aberration and distortion aberration.

In the present embodiment, the first lens L1 constitutes the first lens group G1, and the second lens L2 and the third lens L3 constitute the second lens group G2. The fourth lens L4 and the fifth lens L5 constitute the third lens group G3, and the sixth lens L6 constitutes fourth lens group G4.

In the present embodiment, the image-side surface of the first lens group G1 (that is, the image-side surface S2 of the first lens L1) is concave. The object-side surface S3 of the second lens L2, which is closest to the object side in the second lens group G 2, is concave. These concave surfaces (S2 and S3) are opposed to each other.

Further, the surface closest to the object side in the fourth lens group G4 (the object-side surface S10 of the sixth lens L6) is concave. The surface closest to the image side in the third lens group G3 (the image-side surface S9 of the fifth lens L5) is also concave. These concave surfaces (S10 and S9) are opposed to each other.

With such a configuration in which concave surfaces are opposed to each other, the above-described aberrations can be corrected more successfully.

In FIGS. 2 to 8, the lens surfaces S1 to S5 of the lenses L1 to L3, the optical surface S6 of the stop 30, the lens surfaces S6 to S7 to S11 of the lenses L4 to L6 are arranged in that order from the object side.

The lens surface S3 closest to the object side in the second lens group G2 is concave, which successfully reduces the diameter of the first lens group G1 and corrects coma aberration of light rays (lower light rays) below the principal ray.

Further, the surface S9 closest to the image side in the third lens group G3 is concave, which successfully reduces the diameter of the fourth lens group G4 and corrects coma aberration of light rays (upper light rays) above the principal ray.

The power configuration of the lens system 10 is basically symmetric as described above. However, when the lens system 10 is used as a camera lens at low magnification, a completely symmetric power configuration might hamper the achievement of high performance.

In view of such circumstances, in the present embodiment, appropriate asymmetry is given between the second lens group G2 and the third lens group G3 facing each other across the stop 30, and only a cemented lens is disposed between the stop 30 and the first lens group G1 and between the stop 30 and the fourth lens group G4 while obtaining the degree of freedom of correction of various kinds of aberrations.

With such a configuration, an increase in manufacturing error sensitivity can be prevented and assembly of a lens unit can be facilitated.

Further, with such a configuration, lateral chromatic aberration and color difference of coma aberration can be successfully corrected while achieving the reduction of the size of the device.

Further, in the present embodiment, the sixth lens L6 constituting the fourth lens group G4 has a weaker refractive power than the other lens groups. With such a configuration, the position of the exit pupil is adjusted and the angle at which the principal rays hit the image plane Im at the peripheral image height is set within an appropriate range.

In the lens system 10 according to the embodiments of the present disclosure, in addition to the previous configuration, the following conditional expression (1) is desirably satisfied when f1 denotes the focal length of the first lens group G1 and f4 denotes the focal length of the fourth lens group G4.

[Formula 1]

$$-0.1 < f1/f4 < 0.6 \tag{1}$$

The numerical range of conditional formula (1) will be described.

The lens system 10 according to an embodiment of the present disclosure is designed to achieve the reduction in size and high performance under the conditions that the angle, at which the principal rays hit the maximum image height of the image plane Im, is substantially equal to the half angle of view of from approximately 35 to 43 degrees.

When the value of f1/f4 falls below the lower limit of conditional expression (1) (f1/f4 is less than or equal to −0.1), the retrofocus effect of the lens system 10 increases so that the principal point moves to the image side. This hampers the reduction in the total length of the lens system 10, and thus the reduction in the size of the imaging device 100 results in failure.

Furthermore, the exit pupil moves to the object side so that the lens diameter of the fourth lens group G4, that is, the sixth lens L6 adversely increases.

On the other hand, when the value of f1/f4 exceeds the upper limit of the conditional expression (1) (f1/f4 is greater than or equal to 0.6), the telephoto effect of the lens system 10 increases so that the principal point moves to the object side. This advantageously reduces the total length of the lens system 10, but restricts the degree of freedom of aberration correction and increases manufacturing error sensitivity, failing to achieve high performance.

Furthermore, the exit pupil moves to the image side, and the angle, at which the principal rays hit the peripheral image height of the image plane Im, increases.

Furthermore, the exit pupil moves to the object side so that the lens diameter of the fourth lens group G4, that is, the sixth lens L6 adversely increases.

Thus, when the conditional expression (1) is satisfied, the refractive power ratio between the first lens group G1 and the fourth lens group G4 can be optimized to control the position of the exit pupil, so that a compact and high-performance imaging optical system can be provided.

According to an embodiment of the present disclosure, when conditional expression (1) is satisfied, lateral chromatic aberration and coma aberration can be successfully corrected while achieving sufficient miniaturization of the optical system.

It should be noted that, when an F number is approximately 2.8, f1/f4 of conditional expression (1) is preferably greater than −0.1 and less than 0.3.

When f1-2 denotes the combined focal length of the first lens group G1 and the second lens group G2 and f3-2 denotes the combined focal length of the third lens group G3 and the fourth lens group G4 in the lens system 10, the following conditional expression (2) is desirably satisfied.

[Formula 2]

$$0.8 < f1\text{-}2/f3\text{-}4 < 3.0 \tag{2}$$

The conditional expression (2) represents the ratio of the refractive powers in front of and behind the stop 30.

When the value of f1-2/f3-4 of the conditional expression (2) is less than or equal to 0.8, the refractive power on the object side relative to the stop 30 excessively increases. As a result, distortion aberration tends to bend in a positive direction in the peripheral area of the lens, inward coma is likely to occur, and lateral chromatic aberration of a short wavelength tends to occur toward the inside of the screen.

On the other hand, when the value of f1-2/f3-4 of the conditional expression (2) is greater than or equal to 3.0, the refractive power on the image side relative to the stop 30 excessively increases. As a result, distortion aberration tends to occur in a negative direction, outward coma is likely to occur, and lateral chromatic aberration of a short wavelength tends to occur toward the outside of the screen.

Thus, when the conditional expression (2) is satisfied, the ratio of the refractive powers in front of and behind the stop 30 is optimized.

According to an embodiment of the present disclosure, when conditional expression (2) is satisfied, lateral chromatic aberration and coma aberration can be successfully corrected while achieving sufficient miniaturization of the optical system.

When f1 is the focal length of the first lens group G1 and f denotes the focal length of the lens system 10 when the lens system 10 is focused on infinity, the following conditional expression (3) is desirably satisfied.

[Formula 3]

$$-4.0 < f1/f < -2.2 \tag{3}$$

The conditional expression (3) represents the ratio of the refractive power of the first lens group G1 with respect to the entire lens system 10.

When the value of f1/f of the conditional expression (3) is less than or equal to −4.0, the refractive power of the first lens group G1 excessively decreases. As a result, the curvature of field tends to lack in correction and the flatness of the image plane Im is difficult to maintain.

On the other hand, when the value of f1/f of the conditional expression (3) is greater than or equal to −2.2, the refractive power on the image side relative to the stop 30 excessively increases. As a result, distortion aberration tends to occur in a negative direction, outward coma is likely to occur, and lateral chromatic aberration of a short wavelength tends to occur toward the outside of the screen.

According to an embodiment of the present disclosure, when conditional expression (3) is satisfied, lateral chromatic aberration and coma aberration can be successfully corrected while achieving sufficient miniaturization of the optical system.

When r2F denotes the radius of curvature of the surface closest to the object side in the second lens group G2 and f denotes the focal length of the lens system 10 when the lens system 10 is focused on an object at infinity, the following conditional expression (4) is desirably satisfied.

[Formula 4]

$$-1.6 < r2F/f < -0.6 \quad (4)$$

When the value of r2F/f of the conditional expression (4) is less than or equal to −1.6, coma aberration (coma flare) of the lower rays easily occurs in the positive direction at the intermediate image height or astigmatism easily occurs. Further, off-axis rays passing through the first lens group G1 pass through a high position, which might increase the diameter of the lens of the first lens group G1.

When the value of r2F/f of the conditional expression (4) is greater than or equal to −0.6, coma aberration (coma flare) of the lower rays easily occurs in the negative direction at the intermediate image height or spherical aberration is likely to occur in the positive direction.

According to an embodiment of the present disclosure, when conditional expression (4) is satisfied, coma aberration and spherical aberration can be successfully corrected while achieving sufficient miniaturization of the optical system.

According to an embodiment of the present disclosure, when conditional expression (4) is satisfied, coma aberration and spherical aberration can be successfully corrected while achieving sufficient miniaturization of the optical system.

[Formula 5]

$$0.4 < r3R/f < 1.0 \quad (5)$$

When the value of r3R/f of the conditional expression (5) is less than or equal to 0.4, coma aberration (coma flare) of the upper rays easily occurs in the positive direction at the peripheral image height or curvature of field is likely to occur.

When the value of r3R/f of the conditional expression (5) is greater than or equal to 1.0, coma aberration (coma flare) of the upper rays easily occurs in the negative direction at the peripheral image height or astigmatism is likely to occur. Further, off-axis rays passing through the fourth lens group G4 pass through a high position, which increases the diameter of the lens of the fourth lens group G4.

According to an embodiment of the present disclosure, when conditional expression (5) is satisfied, coma aberration can be successfully corrected while achieving sufficient miniaturization of the optical system.

When ndP2-3 denotes the average refractive index of the positive lenses of the second lens group G2 and the third lens group G3 in the lens system 10, the following conditional expression (6) is desirably satisfied.

[Formula 6]

$$1.75 < ndP2\text{-}3 \quad (6)$$

When the value of ndP2-3 of the conditional expression (6) is less than or equal to 1.75, curvature of field tends to lack correction, and inward coma aberration tends to remain at the intermediate image height.

Although the upper limit of conditional expression (6) is not particularly defined, it is more desirable to set the upper limit to approximately 2.0 to 2.1 in consideration of the balance of the refractive index range and cost of the existing optical glass.

According to an embodiment of the present disclosure, when conditional expression (6) is satisfied, coma aberration can be successfully corrected while achieving sufficient miniaturization of the optical system.

When L denotes the distance between the image plane Im and a surface closest to the object in the first lens L1 when the lens system 10 is focused on an object at infinity and f denotes the focal length of the entire lens system 10 when the lens system 10 is focused on an object at infinity, the following conditional expression (7) is desirably satisfied.

[Formula 7]

$$1.3 < L/f < 1.9 \quad (7)$$

The conditional expression (7) defines the most effective lens length of the lens system 10, that is, the distance between the image plane Im and the surface closest to the object in the lens system 10.

When the value of L/f of the conditional expression (7) exceeds the upper limit value, the total length can be sufficiently obtained with respect to the focal length, which is advantageous for aberration correction. However, the lens becomes large and portability is deteriorated.

When the value of L/f of the conditional expression (7) falls below the lower limit value, the lens system 10 is excessively downsized and aberration correction is difficult.

According to an embodiment of the present disclosure, when conditional expression (7) is satisfied, various aberrations can be successfully corrected while achieving sufficient miniaturization of the optical system.

When f denotes the focal length of the lens system 10 as a whole when the lens system 10 is focused on an object at infinity and DT denotes the distance from the surface closest to the object in the first lens group G1 and the surface closest to the image in the fourth lens group G4, the following conditional expression (8) is desirably satisfied.

[Formula 8]

$$0.6 < DT/f < 1.1 \quad (8)$$

The conditional expression (8) represents the ratio of the total lens thickness DT to the focal length of the entire lens system 10.

When the value of DT/f exceeds the upper limit value of the conditional expression (8), the entire lens thickness is sufficiently obtained with respect to the focal length, which is advantageous for aberration correction, but the lens becomes large and portability is deteriorated.

When the value of DT/f of the conditional expression (8) falls below the lower limit value, the lens system 10 is excessively downsized and aberration correction is difficult.

According to an embodiment of the present disclosure, when conditional expression (8) is satisfied, various aberrations can be successfully corrected while achieving sufficient miniaturization of the optical system.

When Y' denotes the maximum image height of the image plane Im projected onto the image sensor 20 and θPmax denotes the incident angle of the principal rays reaching the maximum image height with respect to the image surface Im, the following conditional expressions (9) and (10) are satisfied.

[Formula 9]

$$0.7 < Y'/f < 0.95 \quad (9)$$

[Formula 10]

$$0.6 < \tan(\theta Pmax) < 0.95 \quad (10)$$

The conditional expression (9) defines the angle of view that exerts the best effect in the imaging device 100 using the lens system 10 according to the embodiments of the present disclosure.

The conditional expression (10) defines the angle at which the off-axis rays hit the image plane Im to exert the best effect in the imaging device 100 using the lens system 10 according to the embodiments of the present disclosure.

In the lens system 10 according to the embodiment of the present disclosure, the surface closest to the image in the second lens group G2 and the surface closest to the object in the third lens group G 3 are both convex.

The lens system 10 according to the embodiments of the present disclosure is an imaging optical system in which two lens surfaces face each other across the stop 30 to form a substantially symmetrical power arrangement. Accordingly, coma aberration, distortion aberration, and lateral chromatic aberration can be corrected at a very high level.

More specifically, when r2R denotes the radius of curvature of the surface closest to the image in the second lens group G2 and r3F denotes the radius of curvature of the surface closest to the object in the third lens group G3, it is most desirable to satisfy the following conditional expression (11).

[Formula 11]

$$-2.5 < r2R/r3F < -1.0 \quad (11)$$

When r2C denotes the cemented surface of the cemented lens constituting the second lens group G2, the following conditional expression (12) is desirably satisfied.

[Formula 12]

$$0.3 < r2C/f < 0.7 \quad (12)$$

When the value of r2C/f of the conditional expression (12) is less than or equal to 0.3, high-order coma aberration is likely to occur and chromatic aberration of coma is likely to occur.

When the value of r2C/f of the conditional expression (12) is greater than or equal to 0.7, correction of axial chromatic aberration becomes difficult and curvature of field tends to significantly occur.

When vdn1 denotes the Abbe number of the negative lens constituting the first lens group G1 of the lens system 10, the following conditional expression (13) is desirably satisfied.

[Formula 13]

$$55 < vdn1 < 85 \quad (13)$$

When the Abbe number vdn1 is less than or equal to 55, the chromatic aberration correction loses balance and it is difficult to satisfactorily correct both axial chromatic aberration and lateral chromatic aberration.

Also, since the optical material whose Abbe number vdn1 is 85 or more is generally soft and easily scratched or has a difficulty in chemical durability, such an optical material is not suitable for the lens closest to the object in the lens system 10, that is, the lens closest to the object exposed to outside.

For better aberration correction, it is desirable to use an aspherical lens for both the first lens group G1 and the fourth lens group G4. With such a configuration, astigmatism, coma aberration, and distortion aberration can be corrected more successfully.

Hereinafter, the numerical examples of the lens system 10 are described.

In all the numerical examples, the maximum image height is 14.2 mm. However, no limitation is intended thereby, and the maximum image height may be appropriately changed within a range that satisfies the above conditional expressions.

The meanings of the symbols in the numerical examples below are as follows. f: Focal length of the entire system, F: F number, ω: half angle of view, R: radius of curvature, D: surface distance, Nd: refractive index, vd: Abbe number, Pg, F: partial dispersion ratio . . . Pg, F=(ng−nF)/(NF−nC), K: conic constant of aspheric surface, A4: fourth-order aspheric coefficient, A6: sixth-order aspheric coefficient, A8: eighth-order aspherical coefficient, A10: tenth-order aspheric coefficient, A12: twelfth-order aspherical coefficient, A14: fourteenth-order aspherical coefficient. However, the aspherical surface used here is represented by the following formula when C denotes the reciprocal (paraxial curvature) of the paraxial radius of curvature (paraxial curvature) and H is the height from the optical axis.

$$X = \frac{CH^2}{1+\sqrt{(1-(1+K)C^2H^2}} + A_4 \cdot H^4 + A_6 \cdot H^6 + \quad \text{[Formula 14]}$$

$$A_8 \cdot H^8 + A_{10} \cdot H^{10} + A_{12} \cdot H^{12} + A_{14} \cdot H^{14}$$

Numerical Example 1 f=18.46, F=2.87, ω=38.0

TABLE 1

| Surface Number | R | D | $N_d$ | $v_d$ | $P_{g,F}$ |
| --- | --- | --- | --- | --- | --- |
| 1 | 23.14 | 0.7 | 1.51633 | 64.06 | 0.5333 |
| 02* | 12.887 | 2.53 | | | |
| 3 | −21.976 | 0.6 | 1.6398 | 34.47 | 0.5922 |
| 4 | 8.436 | 2.67 | 1.883 | 40.76 | 0.5667 |
| 5 | −26.333 | 1.1 | | | |
| 6 | STOP | 1.2 | | | |
| 7 | 13.859 | 2.72 | 1.883 | 40.76 | 0.5667 |
| 8 | −8.706 | 0.5 | 1.68893 | 31.07 | 0.6004 |
| 9 | 12.365 | 1.56 | | | |
| 10* | −17.8 | 1 | 1.861 | 37.1 | 0.5785 |
| 11* | −18.465 | 12.805 | | | |
| 12 | ∞ | 1.4 | 1.51633 | 64.14 | |
| 13 | ∞ | | | | |

Aspherical Surface: The Second Surface
K=0.0,
A4=2.39582×10⁻⁴,
A6=1.09403×10⁻⁵,
A8=−8.93602×10⁻⁷,
A10=6.33374×10⁻⁸,
A12=−1.94805×10⁻⁹, A14=2.50856×10$^{-11}$
Aspheric Surface: The Tenth Surface
K=0.0,
A4=8.61980×10$^{-5}$,
A6=−2.76787×10$^{-6}$
Aspherical Surface: The Eleventh Surface
K=8.64103,
A4=4.77392×10$^{-4}$,
A6=7.10 137×10$^{-6}$,
A8=−9.62038×10$^{-8}$,
A10=6.79734×10$^{-9}$
Conditional Expression Numerical Value
(1) f1/f4=0.031
(2) f1-2/f3-4=1.767
(3) f1/f=−3.124
(4) r2F/f=−1.190
(5) r3R/f=0.670
(6) ndP2-3=1.883
(7) L/f=1.597
(8) DT/f=0.790
(9) Y'/f=0.769
(10) tan (θPmax)=0.765
(11) r2R/r3F=−1.900
(12) r3C/f=0.457
(13) νdn1=64.06

Numerical Example 2 f=18.49, F=2.86, ω=37.9

TABLE 2

| Surface Number | R | D | $N_d$ | $ν_d$ | $P_{g,F}$ |
|---|---|---|---|---|---|
| 1 | 21.912 | 0.8 | 1.58313 | 59.46 | 0.5404 |
| 02* | 13.136 | 2.36 | | | |
| 3 | −21.409 | 0.6 | 1.6398 | 34.47 | 0.5922 |
| 4 | 8.362 | 2.87 | 1.883 | 40.76 | 0.5667 |
| 5 | −24.803 | 1.1 | | | |
| 6 | STOP | 1.2 | | | |
| 7 | 13.834 | 2.69 | 1.883 | 40.76 | 0.5667 |
| 8 | −8.699 | 0.5 | 1.68893 | 31.07 | 0.6004 |
| 9 | 11.805 | 1.46 | | | |
| 10* | −19.158 | 1 | 1.85135 | 40.1 | 0.5694 |
| 11* | −19.589 | 12.755 | | | |
| 12 | ∞ | 1.4 | 1.51633 | 64.14 | |
| 13 | ∞ | | | | |

Aspherical Surface: The Second Surface
K=0.0,
A4=2.68967×10$^{-4}$,
A6=−4.58263×10$^{-7}$,
A8=4.00133×10$^{-7}$,
A10=−1.35475×10$^{-8}$,
A12=3.17395×10$^{-10}$,
A14=−1.36710×10$^{-12}$
Aspheric Surface: The Tenth Surface
K=0.0,
A4=8.14051×10$^{-5}$,
A6=−5.35844×10$^{-6}$
Aspherical Surface: The Eleventh Surface
K=8.84476,
A4=4.57704×10$^{-4}$,
A6=2.52368×10$^{-6}$,
A8=6.66033×10$^{-9}$,
A10=3.97299×10$^{-9}$
Conditional Expression Numerical Value
(1) f1/f4=−0.004
(2) f1-2/f3-4=1.541
(3) f1/f=−3.148
(4) r2F/f=−1.158
(5) r3R/f=0.669
(6) ndP2-3=1.883
(7) L/f=1.592
(8) DT/f=0.789
(9) r/f=0.768
(10) tan(θPmax)=0.773
(11) r2R/r3F=−1.793
(12) r3C/f=0.452
(13) νdn1=59.46

Numerical Example 3 f=17.84, F=2.87, ω=38.8

TABLE 3

| Surface Number | R | D | $N_d$ | $ν_d$ | $P_{g,F}$ |
|---|---|---|---|---|---|
| 1 | 24.961 | 0.8 | 1.51633 | 64.06 | 0.5333 |
| 02* | 13.937 | 1.92 | | | |
| 3 | −25.434 | 0.6 | 1.64769 | 33.79 | 0.5938 |
| 4 | 7.318 | 2.79 | 1.883 | 40.76 | 0.5667 |
| 5 | −27.723 | 0.9 | | | |
| 6 | STOP | 1.1 | | | |
| 7 | 15.266 | 2.62 | 1.883 | 40.76 | 0.5667 |
| 8 | −7.705 | 0.6 | 1.6727 | 32.1 | 0.5988 |
| 9 | 11.738 | 1.47 | | | |
| 10* | −24.824 | 1.1 | 1.854 | 40.38 | 0.5688 |
| 11* | −26.317 | 11.597 | | | |
| 12 | ∞ | 1.4 | 1.51633 | 64.14 | |
| 13 | ∞ | | | | |

Aspherical Surface: The Second Surface
K=0.0,
A4=3.72951×10$^{-4}$,
A6=3.24602×10$^{-6}$,
A8=5.33404×10$^{-8}$,
A10=2.01818×10$^{-8}$,
A12=−9.51799×10$^{-10}$,
A14=1.91260×10$^{-11}$
Aspheric Surface: The Tenth Surface
K=0.0,
A4=−3.28215×10$^{-4}$,
A6=−1.83240×10$^{-5}$
Aspherical Surface: The Eleventh Surface
K=19.98002,
A4=9.73270 10$^{-5}$,
A6=−3.03423×10$^{-6}$,
A8=−1.89893×10$^{-7}$,
A10=1.32511×10$^{-8}$
Conditional Expression Numerical Value
(1) f1/f4=0.081
(2) f1-2/f3-4=1.223
(3) f1/f=−3.512
(4) r2F/f=−1.425
(5) r3R/f=0.658
(6) ndP2-3=1.883
(7) L/f=1.547
(8) DT/f=0.779
(9) Y'/f=0.796
(10) tan(θPmax)=0.828
(11) r2R/r3F=−1.816

(12) r3C/f=0.410
(13) vdn1=64.06

Numerical Example 4 f=18.29, F=2.87, ω=38.2

TABLE 4

| Surface Number | R | D | $N_d$ | $v_d$ | $P_{g,F}$ |
|---|---|---|---|---|---|
| 1 | 28.932 | 0.8 | 1.51633 | 64.06 | 0.5333 |
| 02* | 14.947 | 1.79 | | | |
| 3 | −20.736 | 0.6 | 1.6398 | 34.47 | 0.5922 |
| 4 | 7.987 | 2.82 | 1.883 | 40.76 | 0.5667 |
| 5 | −24.675 | 0.9 | | | |
| 6 | STOP | 1.1 | | | |
| 7 | 14.854 | 2.72 | 1.883 | 40.76 | 0.5667 |
| 8 | −8.223 | 0.6 | 1.68893 | 31.07 | 0.6004 |
| 9 | 12.851 | 1.55 | | | |
| 10 | −13.712 | 1.1 | 1.88202 | 37.22 | 0.5769 |
| 11* | −14.38 | 12.452 | | | |
| 12 | ∞ | 1.4 | 1.51633 | 64.14 | |
| 13 | ∞ | | | | |

Aspherical Surface: The Second Surface
K=0.0,
A4=2.67419×10$^{-4}$,
A6=1.46337×10$^{-5}$,
A8=−1.15262×10$^{-6}$,
A10=8.30471×10$^{-8}$,
A12=−2.70440×10$^{-9}$,
A14=3.79775×10$^{-11}$
Aspherical Surface: The Eleventh Surface
K=1.42113,
A4=2.87593×10$^{-4}$,
A6=4.81917×10$^{-6}$,
A8=4.83416×10$^{-8}$,
A10=6.12592×10$^{-10}$
Conditional Expression Numerical Value
(1) f1/f4=0.042
(2) f1-2/f3-4=1.462
(3) f1/f=−3.339
(4) r2F/f=−1.134
(5) r3R/f=0.703
(6) ndP2-3=1.883
(7) L/f=1.560
(8) DT/f=0.764
(9) Y'/f=0.776
(10) tan(θPmax)=0.777
(11) r2R/r3F=−1.661
(12) r3C/f=0.437
(13) vdn1=64.06

Numerical Example 5 f=18.28, F=2.87, ω=38.2

TABLE 5

| Surface Number | R | D | $N_d$ | $v_d$ | $P_{g,F}$ |
|---|---|---|---|---|---|
| 1 | 17.034 | 0.7 | 1.51633 | 64.06 | 0.5333 |
| 02* | 10.894 | 2.46 | | | |
| 3 | −18.486 | 0.6 | 1.6398 | 34.47 | 0.5922 |
| 4 | 8.332 | 2.75 | 1.881 | 40.14 | 0.5701 |
| 5 | −25.206 | 1.1 | | | |
| 6 | STOP | 1.2 | | | |
| 7 | 13.099 | 2.76 | 1.881 | 40.14 | 0.5701 |
| 8 | −8.666 | 0.5 | 1.69895 | 30.13 | 0.603 |
| 9 | 12.744 | 1.52 | | | |

TABLE 5-continued

| Surface Number | R | D | $N_d$ | $v_d$ | $P_{g,F}$ |
|---|---|---|---|---|---|
| 10* | −16.835 | 1 | 1.88202 | 37.22 | 0.5769 |
| 11* | −17.51 | 12.807 | | | |
| 12 | ∞ | 1.4 | 1.51633 | 64.14 | |
| 13 | ∞ | | | | |

Aspheric Surface; The Second Surface
K=0.0,
A4=2.49546×10$^{-4}$,
A6=5.30767×10$^{-6}$,
A8=−1.77772×10$^{-7}$,
A10=2.52567×10$^{-8}$,
A12=−9.46560×10$^{-10}$,
A14=1.70552×10$^{-11}$
Aspheric Surface: The Tenth Surface
K=0.0,
A4=2.21965×10$^{-4}$,
A6=−7.8418 1 10$^{-7}$
Aspherical Surface: The Eleventh Surface
K=7.28422,
A4=6.02712×10$^{-4}$,
A6=8.85505×10$^{-6}$,
A8=−5.39399×10$^{-8}$,
A10=4.60086×10$^{-9}$
Conditional Expression Numerical Value
(1) f1/f4=0.038
(2) f1-2/f3-4=2.294
(3) f1/f=−3.331
(4) r2F/f=−1.011
(5) r3R/f=0.697
(6) ndP2-3=1.881
(7) L/f=1.613
(8) DT/f=0.798
(9) Y'/f=0.777
(10) tan(θPmax)=0.769
(11) r2R/r3F=−1.924
(12) r3C/f=0.456
(13) vdn1=64.06

Numerical Example 6 f=18.45, F=2.87, ω=38.0

TABLE 6

| Surface Number | R | D | $N_d$ | $v_d$ | $P_{g,F}$ |
|---|---|---|---|---|---|
| 1 | 20.798 | 0.7 | 1.58313 | 59.38 | 0.5423 |
| 02* | 12.11 | 2.46 | | | |
| 3 | −16.845 | 0.6 | 1.61293 | 37 | 0.5862 |
| 4 | 8.688 | 2.98 | 1.83481 | 42.72 | 0.5648 |
| 5 | −20.339 | 1.1 | | | |
| 6 | STOP | 1.21 | | | |
| 7 | 11.799 | 2.94 | 1.83481 | 42.72 | 0.5648 |
| 8 | −8.814 | 0.5 | 1.6727 | 32.1 | 0.5988 |
| 9 | 11.699 | 1.6 | | | |
| 10* | −17.164 | 1 | 1.9027 | 31 | 0.5943 |
| 11* | −18.04 | 13.039 | | | |
| 12 | ∞ | 1.4 | 1.51633 | 64.14 | |
| 13 | ∞ | | | | |

Aspherical Surface: The Second Surface
K=0.0,
A4=2.25513×10$^{-4}$,
A6=5.62684×10$^{-6}$,
A8=−3.11498×10$^{-7}$,
A10=2.96319×10$^{-8}$, A12=−9.92939×10⁻¹⁰,
A14=1.49463×10⁻¹¹
Aspheric Surface: The Tenth Surface
K=0.0,
A4=2.67595×10⁻⁴,
A6=−7.23834×10⁻⁸
Aspherical Surface: The Eleventh Surface
K=8.02127,
A4=6.35106×10⁻⁴,
A6=1.02195×10⁻⁵,
A8=−9.60305×10⁻⁸,
A10=6.19345×10⁻⁹.
Conditional Expression Numerical Value
(1) f1/f4=0.060
(2) f1-2/f3-4=2.348
(3) f1/f=−2.777
(4) r2F/f=−0.913
(5) r3R/f=0.634
(6) ndP2-3=1.835
(7) L/f=1.638
(8) DT/f=0.818
(9) Y'/f=0.770
(10) tan(Pmax)=0.755
(11) r2R/r3F=−1.724
(12) r3C/f=0.471
(13) vdn1=59.38

Numerical Example 7 f=15.70, F=3.27, ω=42.3

TABLE 7

| Surface Number | R | D | $N_d$ | $v_d$ | $P_{g,F}$ |
|---|---|---|---|---|---|
| 1 | 19.742 | 0.7 | 1.58313 | 59.38 | 0.5423 |
| 02* | 11.85 | 2.46 | | | |
| 3 | −12.492 | 0.6 | 1.5927 | 35.31 | 0.5933 |
| 4 | 9.512 | 2.46 | 1.83481 | 42.72 | 0.5648 |
| 5 | −16.061 | 1.1 | | | |
| 6 | STOP | 1.2 | | | |
| 7 | 10.604 | 2.97 | 1.83481 | 42.72 | 0.5648 |
| 8 | −7.496 | 0.5 | 1.6727 | 32.1 | 0.5988 |
| 9 | 12.03 | 1.43 | | | |
| 10* | −14.261 | 1 | 1.9027 | 31 | 0.5943 |
| 11* | −17.022 | 10.301 | | | |
| 12 | ∞ | 1.4 | 1.51633 | 64.14 | |
| 13 | ∞ | | | | |

Aspherical Surface: Second Surface
K=0.0,
A4=2.71502×10⁻⁴,
A6=9.04308×10⁻⁶,
A8=−6.14012×10⁻⁷,
A10=5.78048×10⁻⁸,
A12=−2.15199×10⁻⁹,
A14=3.93607×10⁻¹¹
Aspheric Surface: The Tenth Surface
K=0.0,
A4=5.77816×10⁻⁴,
A6=−3.98329×10⁻⁶
Aspherical Surface: Eleventh Surface
K=5.29089,
A4=1.01998×10⁻³,
A6=1.03128×10⁻⁵,
A8=−3.03249×10⁻⁸,
A10=1.61176×10⁻⁹

Conditional Expression Numerical Value
(1) f1/f4=0.447
(2) f1-2/f3-4=2.525
(3) f1/f=−3.348
(4) r2F/f=−0.796
(5) r3R/f=0.766
(6) ndP2-3=1.835
(7) L/f=1.709
(8) DT/f=0.919
(9) Y'/f=0.905
(10) tan(θPmax)=0.925
(11) r2R/r3F=−1.515
(12) r3C/f=0.606
(13) vdn1=59.38

Numerical Example 8

F=17.00, F=2.96, ω=40.2

TABLE 8

| Surface Number | R | D | $N_d$ | $v_d$ | $P_{g,F}$ |
|---|---|---|---|---|---|
| 1 | 19.439 | 0.7 | 1.55332 | 71.68 | 0.5402 |
| 02* | 11.871 | 2.65 | | | |
| 3 | −18.019 | 0.61 | 1.64769 | 33.79 | 0.5938 |
| 4 | 8.316 | 2.48 | 1.883 | 40.76 | 0.5667 |
| 5 | −21.55 | 0.9 | | | |
| 6 | STOP | 1.11 | | | |
| 7 | 12.474 | 2.65 | 1.883 | 40.76 | 0.5667 |
| 8 | −8.112 | 0.5 | 1.68893 | 31.07 | 0.6004 |
| 9 | 11.685 | 1.48 | | | |
| 10* | −17.538 | 1 | 1.80625 | 40.91 | 0.5691 |
| 11* | −19.9 | 11.493 | | | |
| 12 | ∞ | 1.4 | 1.51633 | 64.14 | |
| 13 | ∞ | | | | |

Aspherical Surface: Second Surface
K=0.0,
A4=2.73421×10⁻⁴,
A6=9.57620×10⁻⁶,
A8=−5.17927×10⁻⁷,
A10=4.42696×10⁻⁸,
A12=−1.46086×10⁻⁹,
A14=2.35256×10⁻¹¹
Aspheric Surface: The Tenth Surface
K=0.0,
A4=1.38887×10⁻⁴,
A6=−5.07770×10⁻⁶
Aspherical Surface: Eleventh Surface
K=11.77417,
A4=6.26999×10⁻⁴,
A6=1.15300×10⁻⁵,
A8=−2.66704×10⁻⁷,
A10=1.30462×10⁻⁸
Conditional Expression Numerical Value
(1) f1/f4=0.252
(2) f1-2/f3-4=1.850
(3) f1/f=−3.352
(4) r2F/f=−1.060
(5) r3R/f=0.687
(6) ndP2-3=1.883
(7) L/f=1.628
(8) DT/f=0.828
(9) Y'/f=0.835
(10) tan(θPmax)=0.848
(11) r2R/r3F=−1.728
(12) r3C/f=0.489
(13) vdn1=71.68

An embodiment of a portable information terminal is described with reference to FIGS. 18A, 18B, 18C, and 19.

The camera 200 as a portable information terminal device according to the present embodiment includes a photographing lens 210, and an image sensor 20 as a photoreceptor such as an area sensor, a control unit 230, and is configured to read an image of an object 300 formed by the photographing lens 210 on the image sensor 20.

Figure 18A:
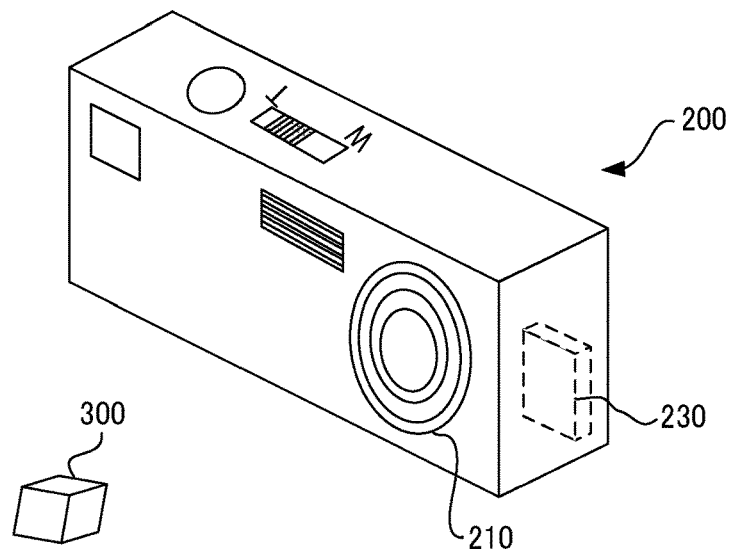
FIGS. 18A, 18B, and 18C are illustrations of an information terminal device according to an embodiment of the present disclosure.
Figure 18B:
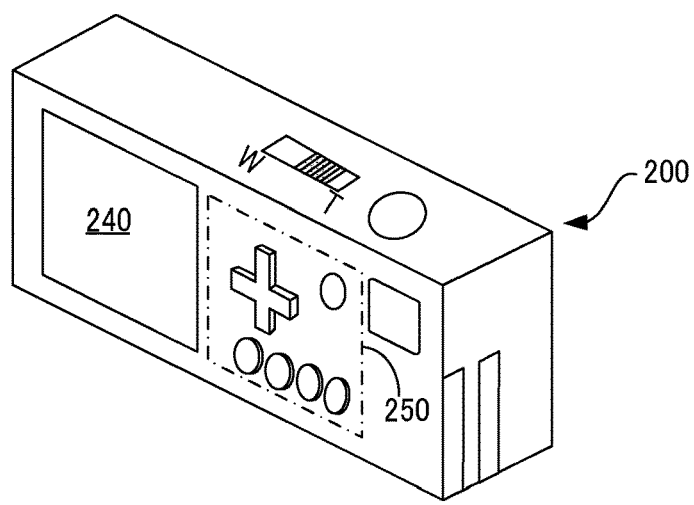

As illustrated in FIG. 18B, the camera 200 includes a liquid crystal monitor 240 as a display for displaying, for example, images captured by the camera 200, and an operation unit 250 as keys with which the user operates the camera 200.

The photographing lens 210 is a lens unit that includes an imaging optical system as the lens system 10 according to any of the first embodiment to the eighth embodiment.

That is, in the present embodiment, the camera 200 serves as an imaging device to form an image on a given imaging area, using the lens system 10.

Figure 19:
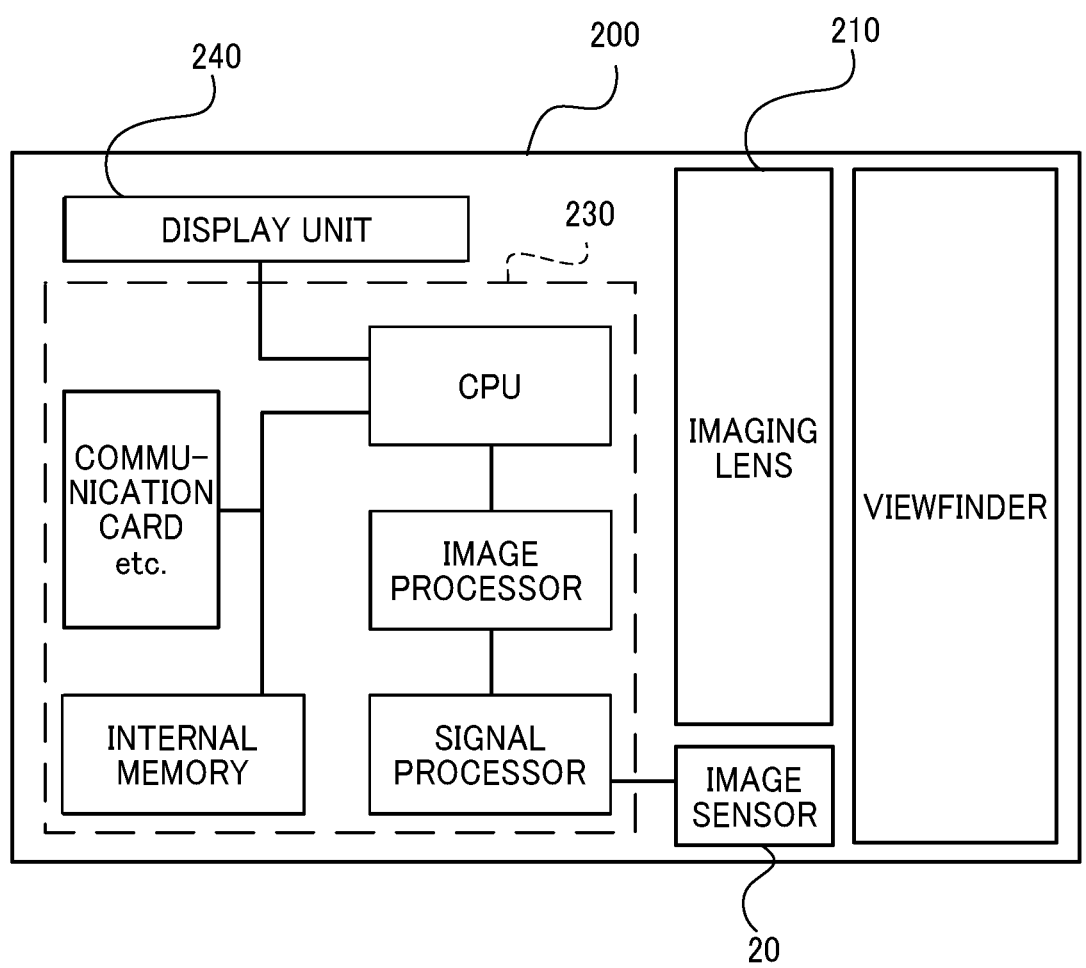
FIG. 19 is a block diagram of a hardware configuration of the control unit in FIG. 18.

As illustrated in FIG. 19, the control unit 230 includes a signal processor for processing a received-light signal from the image sensor 20, an image processor, a central processing unit (CPU), and a storage unit such as an internal memory (semiconductor memory) or a communication card. The control unit 230 serves as a computer.

The CPU 11 controls the signal processor to convert the output of the image sensor 20 into digital data. The image data processed by the signal processor is subjected to a specified image processing performed by the image processor, which is controlled by the CPU, and then is recorded in the internal memory.

A liquid crystal display 240 may display an image that is being captured, or display an image stored in the storage unit. An image stored in the internal memory may be transferred to an external device by a data communication card or the like.

Figure 18C:
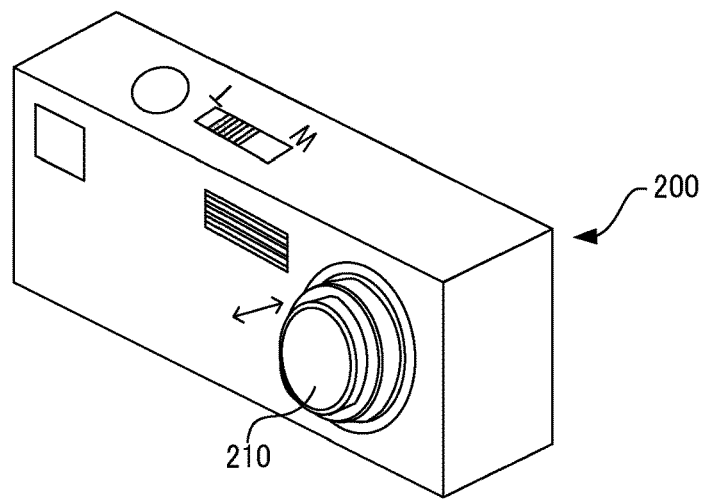

When the camera 200 is being carried, the photographing lens 210 is retracted as illustrated in 18A. When the user turns on the camera 200 by operating the power switch, the lens barrel is extended as illustrated in FIG. 18C so that the camera 200 is ready for photography. The photographing lens 210 can change a cropping range in an image to change the magnification in a pseudo manner by operating a zoom lever, which is a so-called digital zoom operation. At the same time, the viewfinder also changes the magnification in synchronization with a change in angle of view.

The control unit 230 controls the photographing lens 210 to adjust the focus upon the user's half pressing the shutter button.

In each of the first embodiment to the eighth embodiment, focusing can be performed by moving the lens system 10 as a whole or by moving the image sensor 20.

When the shutter button is further pressed from the half pressed state, photographing is performed.

To display the image recorded in the internal memory onto the liquid crystal monitor 240, or send the image to an external device via the data communication card, the operation unit 250 is operated. The internal memory and the data communication card are inserted into a dedicated or general-purpose slot when used. However, no limitation is intended thereby.

When the photographing lens 210 is retracted inside the camera 200, all the lens groups of the photographing lens 210 may not be arranged along the optical axis. For example, when the second lens group G2 is configured to be retracted from the optical axis to be housed in parallel with the first lens group G1, the camera 200 can be further thinned.

For the camera (portable information terminal device) as described above, the lens system 10 according to the first embodiment to the eighth embodiment can be used as a photographing lens. With such a configuration, various aberrations can be sufficiently reduced while achieving a reduction in the size of the camera as a whole in a high-quality and compact camera (portable information terminal device) mounted with a photoreceptor of 24 million pixels or more.

In the present embodiment, when Y' denotes the maximum image height on the imaging area of the camera 200, θPmax denotes the incident angle of the principal ray that reaches the maximum image height with respect to the imaging area, and f denotes the focal length of the entire lens system 10 when the lens system 10 is focused on an object at infinity, the conditional expressions (9) and (10) are desirably satisfied.

This configuration can sufficiently reduce various aberrations while achieving a reduction in the size of the device as a whole.

Although the embodiments of the present disclosure have been described above, the present disclosure is not limited to the embodiments described above, but a variety of modifications can naturally be made within the scope of the present disclosure. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. An imaging optical system, comprising:
a first lens having negative refractive power, the first lens being a negative lens with a concave surface facing an image side;
a second lens having negative refractive power, the second lens being a negative lens with a concave surface facing the object side;
a third lens having positive refractive power;
an aperture stop;
a fourth lens having positive refractive power;
a fifth lens having negative refractive power; and
a six lens,
wherein the first lens, the second lens, the third lens, the aperture stop, the fourth lens, the fifth lens, and the sixth lens are arranged in that order from the object side,
the second lens and the third lens are joined together to form a cemented lens having positive refractive power,
wherein the fifth lens is a negative lens with a concave surface facing the image side,
the sixth lens is a meniscus lens with a concave surface facing the object side, and
the sixth lens has refractive power weakest among all the lenses of the imaging optical system.

2. The imaging optical system according to claim 1, wherein the fourth lens and the fifth lens are joined together to have positive refractive power.

3. An imaging device comprising the imaging optical system according to claim 1 to form an image on a given imaging area.

4. A portable information terminal device comprising the imaging device according to claim 3.

5. An imaging optical system, comprising:
a first lens having negative refractive power, the first lens being a negative lens with a concave surface facing an image side;
a second lens having negative refractive power, the second lens being a negative lens with a concave surface facing an object side;
a third lens having positive refractive power;
an aperture stop;
a fourth lens having positive refractive power;
a fifth lens having negative refractive power; and
a six lens,
wherein the first lens, the second lens, the third lens, the aperture stop, the fourth lens, the fifth lens, and the sixth lens are arranged in that order from the object side,
the second lens and the third lens are joined together to form a cemented lens having positive refractive power,
wherein the first lens constitutes a first lens group having negative refractive power, the first lens group being a negative lens with a concave surface facing the image side,
the second lens and the third lens constitute a second lens group having positive refractive power, the second lens group being a cemented lens formed by a biconcave lens and a biconvex lens,
the fourth lens and the fifth lens are joined together to form a cemented lens and constitute a third lens group having positive refractive power, the third lens group being a cemented lens formed by a biconvex lens and a biconcave lens,
the sixth lens constitutes a fourth lens group having refractive power weakest among all the lenses of the imaging optical system, the fourth lens group being a meniscus lens with a concave surface facing the object side, and
the first lens group, the second lens group, the aperture stop, the third lens group, and the fourth lens group are arranged in that order from the object side to form an imaging lens.

6. The imaging optical system according to claim 5, wherein conditional expression (1) below is satisfied:

$$-0.1 < f1/f4 < 0.6 \quad (1)$$

where
f1 denotes a focal length of the first lens group, and
f4 denotes a focal length of the fourth lens group.

7. The imaging optical system according to claim 5, wherein conditional expression (2) below is satisfied:

$$0.8 < f1\text{-}2/f3\text{-}4 < 3.0 \quad (2)$$

where
f1-2 denotes a combined focal length of the first lens group and the second lens group, and
f3-4 denotes a combined focal length of the third lens group and the fourth lens group.

8. The imaging optical system according to claim 5, wherein conditional expression (3) below is satisfied:

$$-4.0 < f1/f < -2.2 \quad (3)$$

where
f1 denotes the focal length of the first lens group, and
f denotes a focal length of the imaging optical system as a whole when the imaging optical system is focused on an object at infinity.

9. The imaging optical system according to claim 5, wherein conditional expression (4) below is satisfied:

$$-1.6 < r2F/f < -0.6 \quad (4)$$

where
r2F denotes a radius of curvature of a surface closest to the object side in the second lens group, and
f denotes a focal length of the imaging optical system as a whole when the imaging optical system is focused on an object at infinity.

10. The imaging optical system according to claim 5, wherein conditional expression (5) below is satisfied:

$$0.4 < r3R/f < 1.0 \quad (5)$$

where
r3R denotes a radius of curvature of a surface closest to the image side in the third lens group, and
f denotes a focal length of the imaging optical system as a whole when the imaging optical system is focused on an object at infinity.

11. The imaging optical system according to claim 5, wherein conditional expression (6) below is satisfied:

$$1.75 < ndP2\text{-}3 < 2.0 \quad (6)$$

where
ndP2-3 denotes an average refractive index of positive lenses of the second lens group and the third lens group.

12. The imaging optical system according to claim 5, wherein conditional expression (7) below is satisfied:

$$1.3 < L/f < 1.9 \quad (7)$$

where
L denotes distance from an image plane to a surface closest to the object side in the first lens group when the imaging optical system is focused on an object at infinity, and
f denotes a focal length of the imaging optical system as a whole when the imaging optical system is focused on the object at infinity.

13. The imaging optical system according to claim 5, wherein conditional expression (8) below is satisfied:

$$0.6 < DT/f < 1.1 \quad (8)$$

where
DT denotes distance from a surface closest to the object side in the first lens group and a surface closest to the image side in the fourth lens group, and
f denotes a focal length of the imaging optical system as a whole when the imaging optical system is focused on the object at infinity.

14. An imaging device, comprising:
an imaging optical system to form an image on a given imaging area, the imaging optical system including
a first lens having negative refractive power, the first lens being a negative lens with a concave surface facing an image side;
a second lens having negative refractive power, the second lens being a negative lens with a concave surface facing an object side;
a third lens having positive refractive power;
an aperture stop;
a fourth lens having positive refractive power;
a fifth lens having negative refractive power; and
a six lens,
wherein the first lens, the second lens, the third lens, the aperture stop, the fourth lens, the fifth lens, and the sixth lens are arranged in that order from the object side,
the second lens and the third lens are joined together to form a cemented lens having positive refractive power, and wherein conditional expressions (9) and (10) below are satisfied:

$$0.7 < Y'/f < 0.95 \qquad (9)$$

$$0.6 < \tan(\theta P \, max) < 0.95 \qquad (10)$$

where Y' denotes a maximum image height on the imaging area of the imaging device, θP max denotes an angle at which a principal ray reaching the maximum image height hits an image plane, and f denotes a focal length of the imaging optical system as a whole when the imaging optical system is focused on an object at infinity.

\* \* \* \* \*